United States Patent [19]

Croisier

[11] Patent Number: 5,018,932

[45] Date of Patent: May 28, 1991

[54] APPARATUS FOR HANDLING A LOAD BY ARM, NOTABLY FOR A TRUCK OR TRAILER

[75] Inventor: Jean-Paul Croisier, Geneva, Switzerland

[73] Assignee: Interpatent Anstalt, Grande Rue Vadez, Liechtenstein

[21] Appl. No.: 544,695

[22] Filed: Jul. 23, 1990

Related U.S. Application Data

[63] Continuation of Ser. No. 250,380, Sep. 28, 1988, abandoned.

[30] Foreign Application Priority Data

Sep. 30, 1987 [EP] European Pat. Off. ............ 87114298

[51] Int. Cl.⁵ .............................................. B60P 1/64
[52] U.S. Cl. .................................. 414/498; 414/555; 414/919
[58] Field of Search ............... 414/498, 499, 546, 547, 414/555, 608, 732, 743; 298/11

[56] References Cited

U.S. PATENT DOCUMENTS

| | | | |
|---|---|---|---|
| 4,755,098 | 7/1988 | Wulf et al. | 414/546 |
| 4,902,189 | 2/1990 | Raisio | 414/498 |

Primary Examiner—Robert J. Spar
Assistant Examiner—Robert S. Katz
Attorney, Agent, or Firm—Weintraub, DuRoss & Brady

[57] ABSTRACT

The invention is a handling apparatus for a truck, to be mounted on a truck chassis. A jib is connected to a rigid arm, a crank arm and a disengaged frame, to form the apparatus. The arms can be locked into position by a releasable locking mechanism. Three jacks are positioned in series to manipulate the jib, rigid arm, crank arm and disengaged frame. The handling apparatus is releasably secured on the truck chassis by a second releasable locking mechanism. A load can be lifted to the vertical, horizontal and dumping positions by changing the positions of the crank arm, rigid arm and jib arm.

11 Claims, 5 Drawing Sheets

APPARATUS FOR HANDLING A LOAD BY ARM, NOTABLY FOR A TRUCK OR TRAILER

This is a continuation of application Ser. No. 250,380, filed Sept. 28, 1988, now abandoned.

BACKGROUND OF THE INVENTION

1. Field of the Invention:

The invention concerns a jib-arm handling apparatus designed to be mounted on a truck or on a trailer. The apparatus is provided to handle a container, a truck, a fork-lift truck handling pallet, or more generally, any voluminous load.

2. Summary of the Invention:

The jib-arm apparati of this type comprise generally a jib that can be folded back, operated by one or many lifting jacks and comprises a hook which is hung at the front of the container. These known jib-arm apparati generally present disadvantages of necessitating, in the lifting jack or jacks, a considerable disengaging force, in other words when the container is horizontally disposed on the truck, these previous designs require the load to initially be lifted before it can be swung toward the back in order to empty its contents.

To mitigate this disadvantage, the invention proposes a handling apparatus comprising a rigid jib (or a crossbeam) comprising two arms wherein one of the arms terminates by the handle and hook and the other arm is articulated on the front of a rigid arm, having a back extremity wherein the rigid arm is articulated in turn by its back extremity, on the front of a crank arm, the crank arm having a back section which is ultimately articulated on the back of the chassis of the truck. To provide the force to move the arms, three hydraulic jacks (or three groups of jacks) are provided, namely: (a) a first jack (or two parallel jacks) connecting the extremity in front of the rigid arm at the jib at an angle; (b) a second jack (or two second jacks in parallel) connecting the central part of the disengaged frame at the bearing/carrying chassis of the truck; (c) a third jack (or two third jacks in parallel) connecting the front extremity of the rigid arm at a disengaged frame. The invention connects the second jack and the third jack in parallel on a feeding source under pressure: when one sends the pressure simultaneously in the second and third jacks, it is the second jack that functions in priority because of a very important coupling. By inter-position of a hydraulic throttling solely on the arm of the circuit feeding the second jack, pressure variations are absorbed.

The invention comprises in other respects at the front of the crank arm, a means permitting the bolting of the rigid arm in detachable fashion with the crank arm when it is in the prolongation of the latter. The crank arm, the rigid arm and the inferior arm of the jib can be placed and maintained at an angle as a unite constituting a false chassis obviously level which can be lifted by pivoting around the back axis of the chassis, notably when one wants to lift and incline the container in the fashion of a dump truck.

The invention further comprises at the front of the crank arm some means permitting the bolting of the last arm in a detachable fashion with the chassis when the jib is folded on the back at an angle, when one wants to set the container at ground level or pick it up again from the ground.

The invention lastly permits lifting the swinging false chassis until the crank arm, the rigid arm and the inferior arm of the jib, are in a position to permit vertical placement on the ground of a silo or a similar load that has been transported on the vehicle in the horizontal position. The apparatus according to the invention is schematically represented on the appended drawings, by way of non-limitive examples.

DETAILED DESCRIPTION OF THE PREFERRED EMBODIMENT

Figure 1:
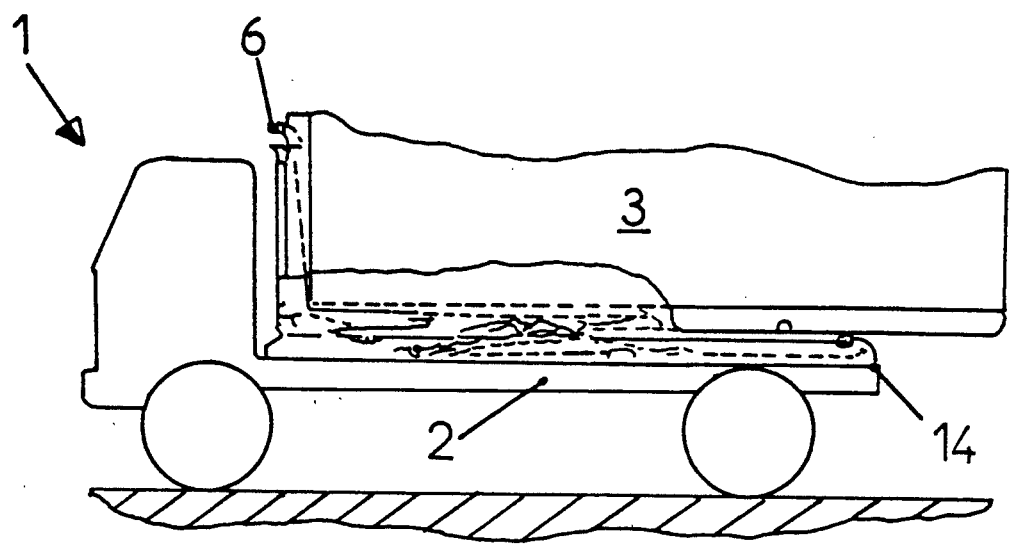
FIG. 1 is a lateral view of the apparatus according to the invention which equips a truck on which is loaded a container in transport position.
Figure 2:
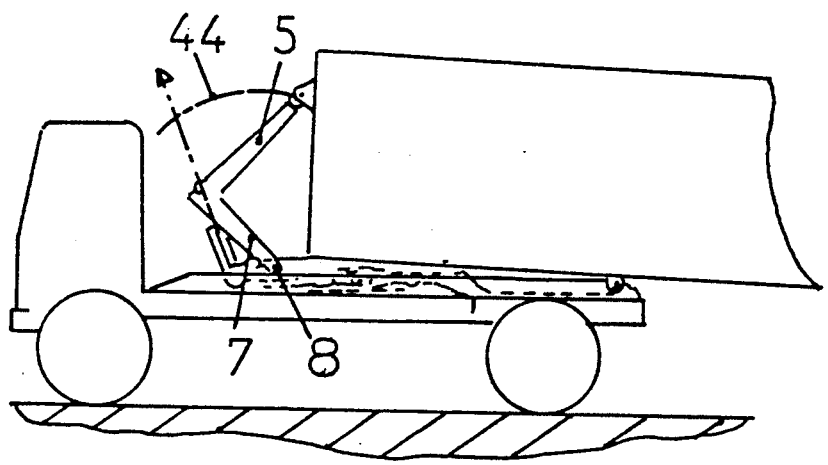
FIGS. 2–6 illustrate the successive phases of the solid maneuvering to move the container to ground level and pick it up again.
Figure 3:
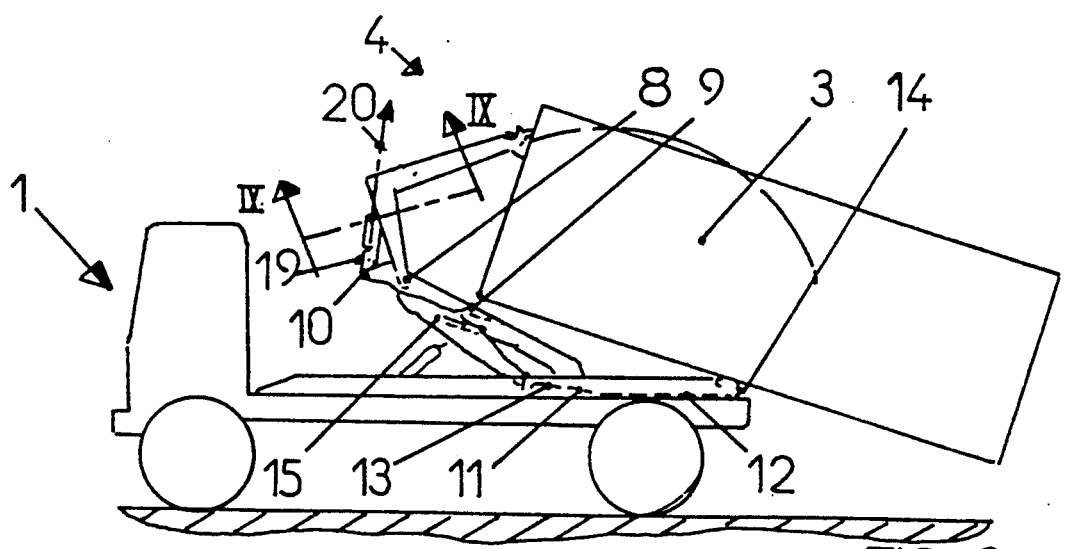
Figure 4:
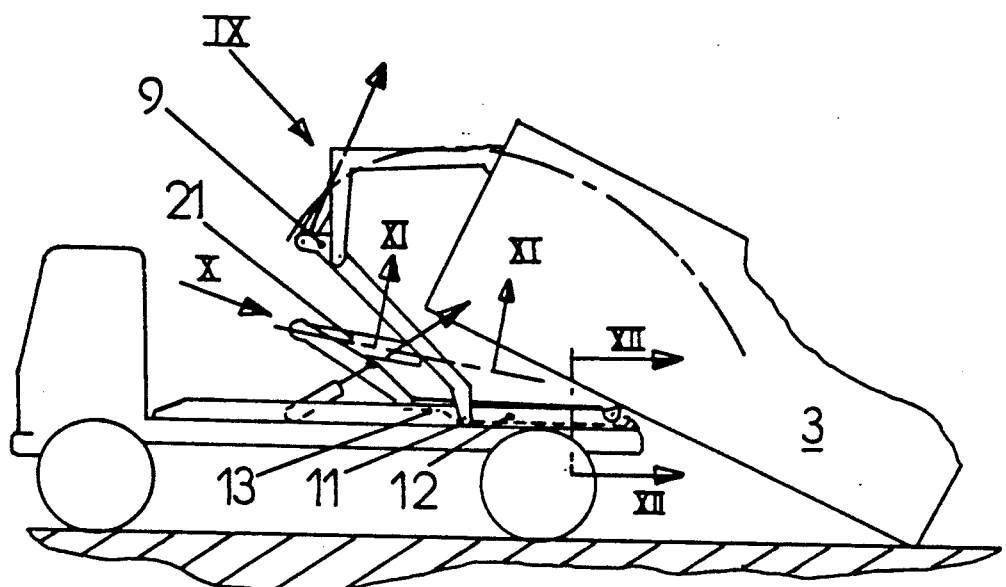
Figure 5:
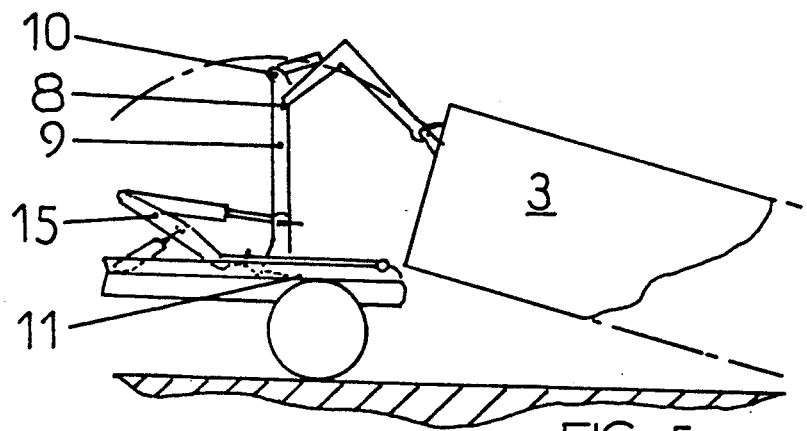
Figure 6:
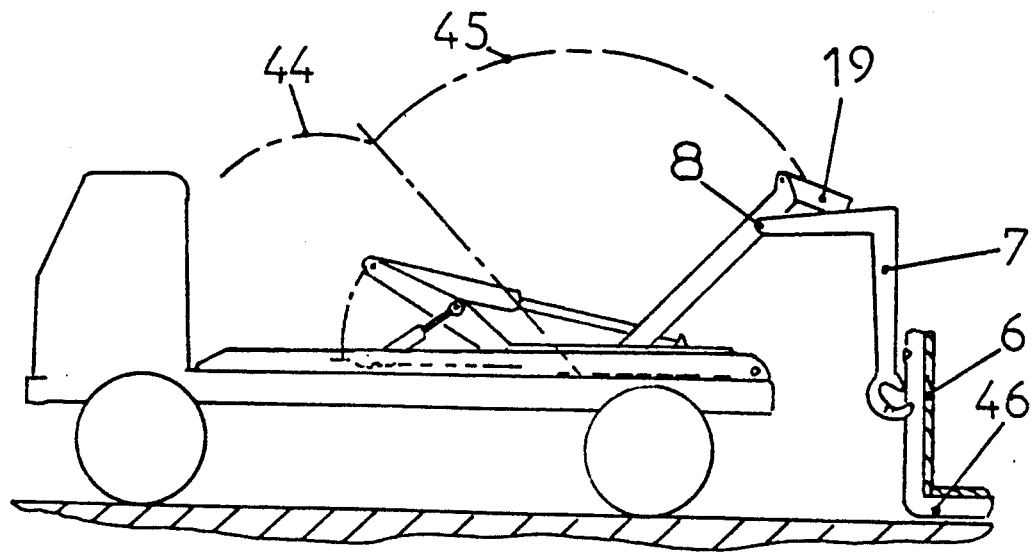

Truck 1 shown in the drawings comprises a bearing/carrying chassis 2 destined to insure the loading and transport of a container 3 (FIG. 1). As shown in FIG. 3, the handling apparatus 4 is fixed on the chassis 2.

This handling apparatus 4 comprises the following mechanical elements: a rigid jib which comprises an upper arm 5 and an inferior arm 7 wherein the upper arm 5 is surmounted by a hook 6 and the inferior arm 7 articulates itself on a horizontal axis 8;

a rigid longitudinal arm 9 comprising a front part and a back part, the front part carrying an axis 8 wherein the longitudinal arm 9 extends beyond the axis 8 to an axis 10 and the back part of the rigid longitudinal arm articulating itself on a horizontal axis 11;

a longitudinal crank arm 12 having a front section which carries the axis 11 where the front section extends itself beyond the axis 11 by a locking lip 13, wherein the crank arm articulates its back part by an axis 14 on a back of the trailer chassis 2;

a rigid disengaged frame 15 which articulates about an axis 16 located on the chassis, also having an axis 17 located on the front of the disengaged frame, and an axis 18 located on the central part of the disengaged frame.

Additionally, the apparatus comprises the following hydraulic elements:

a first hydraulic jack 19 connecting the axis 10 of the arm 9 to a joint axis 20 of the jib 5–7, close to its angular point;

a second jack 23 connecting the central axis 18 to the disengaged frame 15 to an axis 24 carried by the trailer chassis 2 behind the cabin 25 of the truck 1;

a third hydraulic jack 21 articulated between the axis 17 of the disengaged frame 15 and an axis 22 carried by the rigid arm a little in front of its back axis 11.

The second jack 23 and the third jack 21 are connected in parallel on a common feeding source 26 that supplies system pressure to both jacks with a hydraulic throttling valve 29 and a one-way check valve 27 positioned in such a way between the supply source 26 and the jack 21, 23 so that both jacks 21, 23 operate in a pre-designed priority sequence when both extending and retracting when pressure is directed from the common supply source 26.

Figure 11:
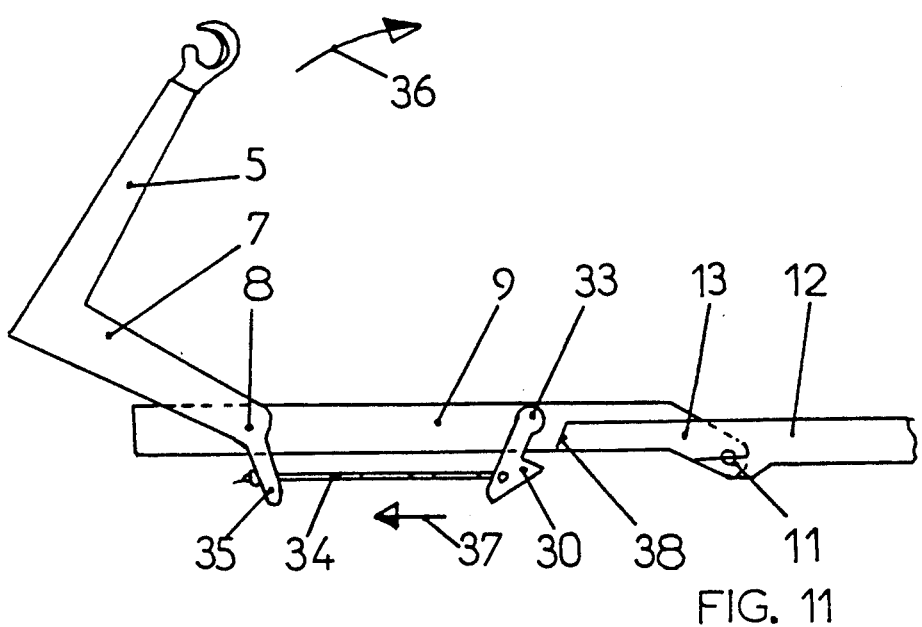
FIG. 11 diagrams the system for bolting the arm on the front of the crank arm.

The crank arm 12 comprises a front part 13 which extends beyond the axis 11. For bolting the crank arm 12 in a detachable fashion on the arm 9 when it is in this extension (FIGS. 7 and 8) one perceives a bolting catch 30, articulated by an axis 33 on the back of the arm 9 (FIG. 11). This catch 30 is connected by a connecting rod 34 at a control finger 35 which extends from the control finger to its axis 8 located on the arm 7 of the jib. As shown in FIG. 11: if the jib 5–7 is turned down toward the back (arrow 36), the rod 34 is lengthened out toward the front (arrow 37) and the catch 30 is free outside of the lip 38 of the front part 13 of the crank arm 12; the arm 9 is then free to turn around its axis 11, independently of the crank arm 12;

if the jib 5, 7 is turned back toward the front (FIGS. 1, 7 and 8), then the arm 9 finds itself in the extension of the crank arm 12 with which it is bolted by the engagement of the catch 30 under the lip 38 in this case the crank arm 12, the rigid arm 9 and the inferior or lower arm 7 of the jib are placed and maintained in the extension 1 as a unit, in such a way as to constitute a false chassis that can be lifted by pivoting around the back axis 14 of the truck trailer chassis 2 such as it would be used to tip the container in the fashion of a dump truck.

The bolting mechanism with a catch 30 (FIG. 11) has an automatic functioning.

Figure 12:
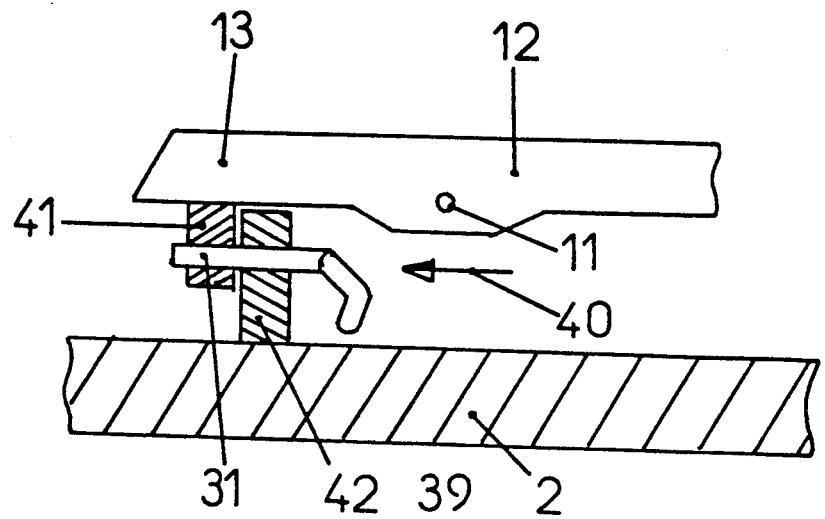
FIG. 12 diagrams the system for bolting the crank arm on the chassis.
Figure 13:
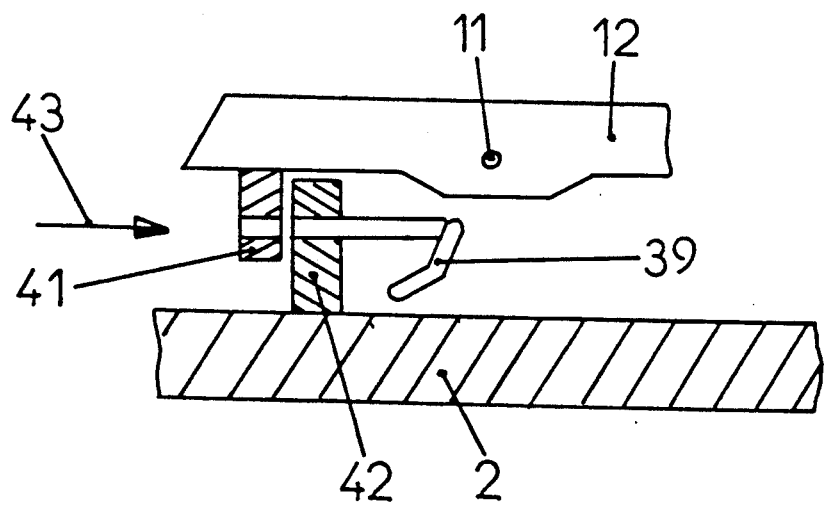
FIG. 13 is an analogous view for the unbolted position of the crank arm of the chassis.

To releasably lock the crank arm to the chassis a sliding hinge mechanism 31 can be used (FIGS. 12 and 13) having a control lever 39 which is manually moved to:

an active position (arrow 40, FIG. 12), where a fork joint 41 interlocks with the crank arm 12, and a fork joint 42 interlocks with the chassis 2; the crank arm 12 is then fixed at the chassis 2 (FIGS. 1–6);

or to a retracted position (arrow 43, FIG. 13). In either the active or retracted position the crank arm 12 can be freely lifted around its axis 11.

In functioning, if one begins by activating the jack 19, leaving the pin bolted 31 (FIG. 12), one observes the following phases:

the jib 5–7 swings toward the back (FIG. 2) which unbolts the lip 38 of the crank arm 12: the hook 6 defines a circle arc 44 around the axis 8;

the jack 23 is then engaged (FIG. 3), which lifts the disengaged frame 15; the hook 6 defines the first part of the circle arc 45 around the axis 11;

the jack 21 is engaged last, (FIGS. 4 and 6) and the hook continues its trajectory on the circle arc 45, until the hook 6 has placed either the container 3 or the handling plate 46 at ground level.

Figure 7:
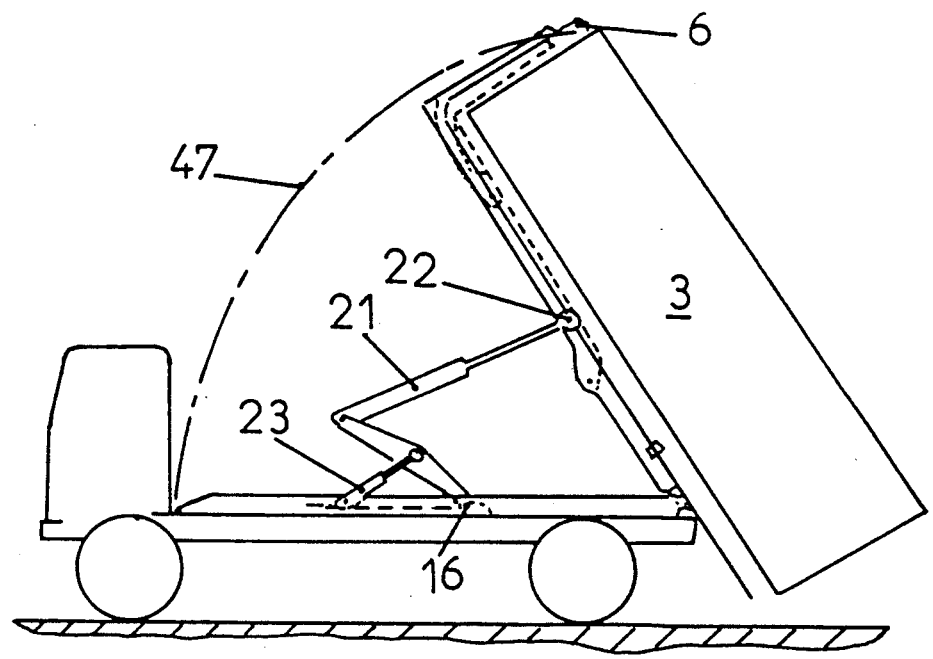
FIG. 7 represents the container emptying maneuver (dumping).
Figure 8:
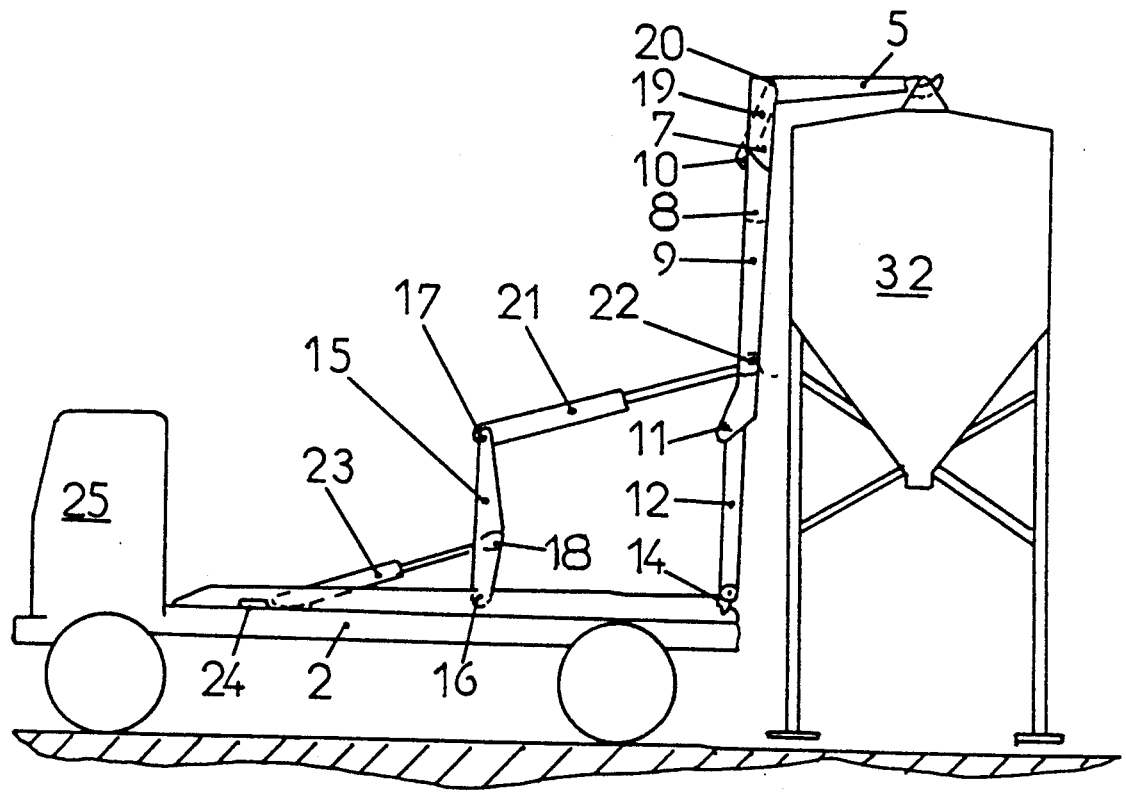
FIG. 8 shows a variation in the method of placing the unloaded silo at ground level in the vertical position.
Figure 9:
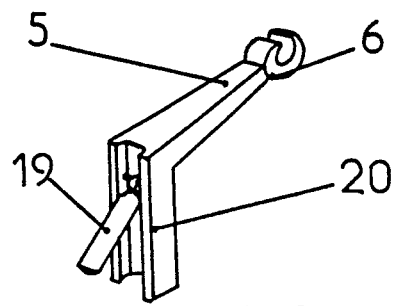
FIG. 9 is a detailed view following the direction of arrow IX (FIG. 4).
Figure 10:
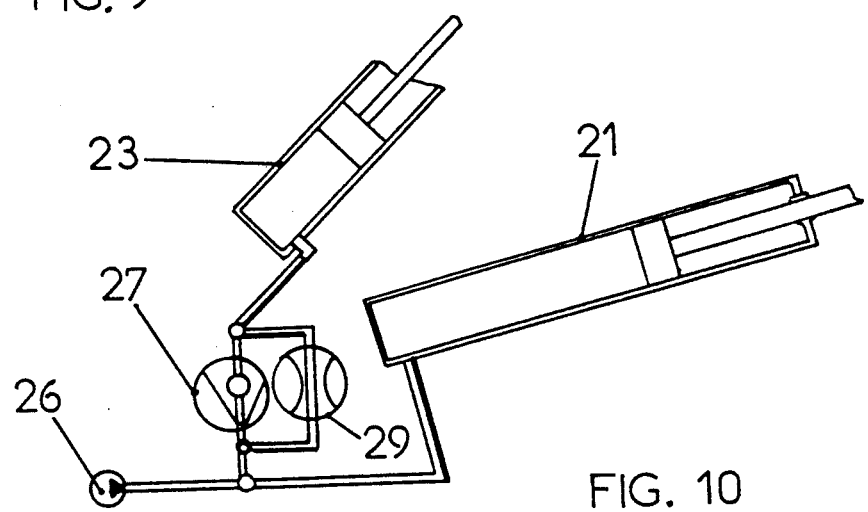
FIG. 10 is a hydraulic diagram showing the principle for connecting up the second and third jacks in parallel on the same liquid source under pressure.

Alternatively, if from the position of FIG. 1 one leaves the pin unbolted 31 (FIG. 12) thereby leaving the catch 30 secured to lip 38, and one directly activates the jack 21 (without beforehand lengthening the jack 19), elements 7, 9 and 12 rigidly remain as a lengthened unit in the fashion of a false chassis (FIGS. 7 and 8). The hook 6 defines the sole circle arc 47 around the back axis 14. The container 3 is lifted in the fashion of a dump truck.

One of the characteristics of the apparatus appearing in FIG. 8 is that the false chassis 7, 9, 12 can be lifted to a vertical position. In this manner a load such as a silo 32 which has been transported in the horizontal on a truck 1 (container position 3 on FIG. 1), the silo may be removed and set down at ground level in a vertical position (FIG. 8).

I claim:

1. A handling apparatus for moving and lifting, with minimal force, a load carried on a truck chassis, to a horizontal, vertical or tipped position, said apparatus comprising:
    (a) a plurality of serially disposed arms comprising:
        (1) a rigid jib having a first arm and a second inferior arm, the first arm comprising a front section and a back section; the front section having an attached handling hook, and the back section attaching to the second inferior arm at approximately a right angle, and the second inferior arm comprising a front section and a back section; the front section of said inferior arm having an axis and the back section of said inferior arm having an axis;
        (2) a rigid arm comprising a front section and a back section, the front section having a first front section axis and the back section having a first back section axis, the first front section axis connecting pivotally to the second inferior arm of the rigid jib at its back section axis;
        (3) a crank arm, comprising a front section and a back section, the front section and back section of the crank arm each having an axis, and the front section of the crank arm comprising a locking lip which extends beyond the front section axis, and the front section of the crank arm connecting pivotally at its front section axis to the first back section axis of the rigid arm;
    (b) a disengaged frame member which is an elongated lever arm having a front section, a middle section and a back section, and having a first lever arm axis, a second lever arm axis and a third lever arm axis, where the first lever arm axis is located on the back section of the lever arm, the lever arm having an aperture formed therein for receipt of a fastening means for mounting the frame member on the truck chassis, the second lever arm axis being located at the middle section of the lever arm and the third lever arm axis being located at the front section of the lever arm; and
    (c) power means for moving the serially disposed arms and disengaged frame member comprising a first, a second, and a third hydraulic jack connected to the arms and frame member.

2. The handling apparatus of claim 1, wherein the hydraulic system for the second and third jacks comprises:
    (a) a system of fluid receiving channels comprising:
        (1) a fluid line common to the second and third jacks to receive hydraulic fluid therethrough;
        (2) a first channel for delivering fluid from the fluid line to the third jack; and
        (3) a second channel parallel to the first channel for directing fluid from the first channel to the third jack; and
    (b) a hydraulic valve system to direct fluid to the second and third jacks in priority sequence comprising:
        (1) a one way check valve located in the first channel which directs fluid to the second jack until a predetermined pressure is reached in the first channel; and (2) a throttle valve located in the second parallel channel for redirecting fluid to the third jack.

3. The handling apparatus of claim 2 further comprising a first releasable locking means comprising:
   (a) a bolting catch which is connected to the rigid arm;
   (b) a connecting rod connected to the bolting catch on the rigid arm; and
   (c) a control finger integral with the rigid jib.

4. The releasable locking means of claim 3 wherein:
   (a) the bolting catch has a first aperture and a second aperture formed therein for receipt of a fastening means, the first aperture receiving a fastening means for attachment of the bolting catch to the first front section axis of the rigid arm while allowing rotation about the first front section axis, and the second aperture of the bolting catch receiving a fastening means for connecting the connecting rod to the bolting catch;
   (b) the connecting rod comprises an elongated rod having a first end and a second end, the first end attaching to the inferior arm of the jib and the second end connecting to the catch; and
   (c) the control finger is integral with the inferior arm of the jib, the jib actuating movement of the connecting rod by means of the control finger, the control finger having an aperture formed therein for receipt of a fastening means, and the connecting rod attaching to the control finger by a fastening means.

5. The handling apparatus of claim 4 further comprising a means for lifting and pivoting a load where the crank arm, the rigid arm and the inferior arm of the jib join as a unit to form a false chassis, the front section of the crank arm being releasably secured to the inferior arm of the jib, both the front section of the crank arm and the rigid arm being releasably secured by the first releasable locking means.

6. The handling apparatus of claim 5 wherein the first releasable locking means is locked when the inferior arm of the jib is in the same plane as the rigid arm; and the control finger, the connecting rod and attached bolting catch are forwarded to engage the bolting catch with the locking lip.

7. The handling apparatus of claim 5 wherein the locking means is unlocked when the second arm of the jib is out of the same plane as the rigid arm, and the connecting rod is retracted to thereby disengage the bolting catch from the locking lip of the crank arm.

8. The handling apparatus of claim 4 wherein a false chassis is defined when the crank arm is releasably secured to the rigid arm and the rigid arm is releasably secured to the lower arm of the jib, both being secured by the first releasable locking means so that the crank arm, rigid arm, and lower arm of the jib extend as a unit along a generally vertical plane.

9. The handling apparatus of claim 5 wherein the false chassis defines a means for moving a container to a dumping position, the false chassis being defined when the second jib arm is releasably secured to the rigid arm and rigid arm is releasably secured to the crank arm, both being secured by the first releasable locking means, so that the second inferior jib arm, the rigid arm and crank arm form a straight, solid unit and are lifted by means of the second and the third jack.

10. The handling apparatus of claim 4 further comprising a second releasable locking means for securing the crank arm to a truck chassis, comprising:
   (a) a sliding hinge mechanism having a first fork joint with a transverse bore, the first fork joint being attached to the crank arm;
   (b) a second fork joint with a transverse bore the second fork joint attaching to a truck chassis;
   (c) a bolting pin insertable through the bores of the first and second fork joints, when the transverse bores of the first and second fork joint are aligned; and
   (d) a moveable control lever which attaches to the first and second fork joints.

11. The handling apparatus of claim 1, wherein the front section of the rigid arm has a second front section axis, the back section of the rigid arm has a second back section axis, and wherein the hydraulic jacks comprise:
   (a) a first jack having a first end and a second end, the first end connected to the second front section axis of the rigid arm and the second end connected to the front section axis of the second inferior arm of the rigid jib, for facilitating movement of the rigid arm and the inferior arm;
   (b) a second jack having a first end and a second end, the first end connected to the second lever arm axis of the disengaged frame member and the second end connected to the truck trailer chassis to facilitate movement of the disengaged frame about the truck chassis; and
   (c) a third jack having a first end and a second end, the first end connected to the third lever arm of the disengaged frame member and the second end connected to the second back section axis of the rigid arm to facilitate movement of the disengaged frame member and the rigid arm.

* * * * *